United States Patent
Mabee et al.

(10) Patent No.: US 9,969,077 B2
(45) Date of Patent: May 15, 2018

(54) WORKPIECE POSITIONING APPARATUS, AND METHOD OF USING SAME

(71) Applicant: LINCOLN GLOBAL, INC., Cleveland, OH (US)

(72) Inventors: Brian Mabee, Shelby Township, MI (US); Reginald Kelley, Shelby Township, MI (US); Russell Yohn, Shelby Township, MI (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 745 days.

(21) Appl. No.: 14/538,443

(22) Filed: Nov. 11, 2014

(65) Prior Publication Data

US 2016/0129535 A1 May 12, 2016

(51) Int. Cl.
*B23P 11/00* (2006.01)
*B25J 5/02* (2006.01)
*B23Q 1/01* (2006.01)
*B23Q 1/52* (2006.01)
*B25J 9/00* (2006.01)

(52) U.S. Cl.
CPC ............... *B25J 5/02* (2013.01); *B23Q 1/015* (2013.01); *B23Q 1/525* (2013.01); *B25J 9/0096* (2013.01)

(58) Field of Classification Search
CPC . B23Q 3/00; B23Q 3/06; B23Q 3/154; B23Q 1/00; B23P 11/00; B23P 13/00
See application file for complete search history.

(56) References Cited

U.S. PATENT DOCUMENTS

| | | | |
|---|---|---|---|
| 3,740,047 A * | 6/1973 | Jenkins, Sr. | D01G 15/34 269/40 |
| 5,658,476 A | 8/1997 | Gullo et al. | |
| 5,873,569 A | 2/1999 | Boyd | |
| 6,036,082 A | 3/2000 | Caldarone | |
| 6,147,323 A | 11/2000 | Erickson | |
| 6,264,418 B1 | 7/2001 | Michael | |
| 6,281,474 B1 | 8/2001 | Michael | |
| 6,347,733 B1 | 2/2002 | Hickey | |
| 6,375,178 B1 | 4/2002 | Schilb | |
| 6,450,490 B1 | 9/2002 | Mangelsen et al. | |
| 6,860,800 B1 * | 3/2005 | Maurer | B23Q 7/02 269/289 MR |

(Continued)

*Primary Examiner* — Lee D Wilson
(74) *Attorney, Agent, or Firm* — Brad Spencer

(57) ABSTRACT

A workpiece positioner is includes a main positioner body including first and second end plate members. The main positioner body also includes a pair of tubular structural members extending between and interconnecting the end plate members, a number of substantially co-planar panel sections disposed between the first and second end plate members, and a number of spaced-apart reinforcing ribs interspersed between the panel sections, the reinforcing ribs also disposed between and interconnecting the tubular structural members. Each of the reinforcing ribs has two opposite side edges, each formed with an arcuate outline shape. The workpiece positioner may also include two or four workpiece support arms attached to the main positioner body, where each of the support arms may have a workpiece-supporting turntable mounted thereon, and may further include first and second shield members attached to the respective tubular members.

A method of operating a workpiece processing machine is also described.

13 Claims, 9 Drawing Sheets

(56) References Cited

U.S. PATENT DOCUMENTS

| | | | |
|---|---|---|---|
| 6,921,011 B1 | 7/2005 | Mangelsen et al. | |
| 6,955,345 B2 * | 10/2005 | Kato | B23Q 1/5437 |
| | | | 269/60 |
| 7,172,376 B1 | 2/2007 | Jagtap | |
| 7,434,491 B1 | 10/2008 | Sutton | |
| 7,837,084 B2 | 11/2010 | Simmons | |
| 8,056,796 B2 | 11/2011 | Simmons | |
| 8,113,415 B2 | 2/2012 | Paquette | |
| 8,146,901 B2 | 4/2012 | Mangelsen | |
| 8,338,751 B2 | 12/2012 | Larkins | |
| 8,777,203 B2 * | 7/2014 | Lee | B23Q 1/527 |
| | | | 269/55 |
| 2006/0226139 A1 | 10/2006 | Jennings | |
| 2015/0159972 A1 * | 6/2015 | Folk | F41A 35/00 |
| | | | 29/426.2 |
| 2016/0129535 A1 * | 5/2016 | Mabee | B23Q 1/015 |
| | | | 29/559 |
| 2016/0194093 A1 * | 7/2016 | McMillan | B23Q 3/062 |
| | | | 29/890.01 |

* cited by examiner

WORKPIECE POSITIONING APPARATUS, AND METHOD OF USING SAME

BACKGROUND OF THE INVENTION

1. Field of the Invention

The present invention relates to a workpiece positioning apparatus configured for use with at least one industrial robot, and to a method of using such apparatus. More particularly, the present invention relates to a workpiece positioning apparatus including a workpiece positioner adapted to provide high strength at a relatively low weight, and to a method of using such apparatus.

2. Description of the Background Art

Some industrial workpiece positioning apparatus are known. A workpiece positioning apparatus is generally operable to manipulate and adjust a position of a workpiece during industrial processing and manufacturing operations.

Michael et al. U.S. Pat. No. 6,281,474 describes one known workpiece positioning apparatus, in which a workpiece positioner has an X-shaped cross-section. Erickson et al., U.S. Pat. No. 6,147,323 discloses a passive laser enclosure including another known workpiece positioning apparatus.

Although the known devices are useful for their intended purposes, a need still exists in the art for an improved workpiece positioning apparatus. In particular, there is a need for an improved workpiece positioning apparatus which will minimize the size of a space through which a workpiece may be rotated, and which exhibits minimal weight, compact size, and high structural strength.

SUMMARY OF THE INVENTION

Accordingly, it is an object of the present invention to provide an improved workpiece positioning apparatus having low weight, compact size, and high structural strength.

In a first aspect of the present invention, the workpiece positioning apparatus comprises a main positioner body including first and second spaced-apart end plate members. The main positioner body also includes two tubular structural members extending between and interconnecting the end plate members, a number of substantially co-planar panel sections disposed between and interconnecting the tubular structural members, and a number of spaced-apart reinforcing ribs interspersed between the panel sections, each of the reinforcing ribs also extending between and interconnecting the two tubular structural members. Each of the reinforcing ribs has two opposite side edges, and each of these side edges is formed with an arcuate outline shape.

In a second aspect of the present invention, in addition to the first aspect, the workpiece positioning apparatus further includes a first shield member operatively attached to the first tubular structural member and extending away from the main positioner body in a first direction. Also in this second aspect, the workpiece positioning apparatus further includes a second shield member attached to the second tubular structural member and extending away from the main positioner body in a second direction substantially parallel to the first direction. According to the second aspect of the invention, the first and second shield members are operatively attached to the main positioner body for concurrent movement therewith.

In a third aspect of the present invention, in addition to the first aspect, the reinforcing ribs of the main positioner body are oriented parallel to one another and also to the end plate members.

In a fourth aspect of the present invention, in addition to the first aspect, the workpiece positioning apparatus further includes first and second workpiece support arms operatively attached to the main positioner body for concurrent movement therewith, each of the workpiece support arms having a workpiece-supporting turntable mounted thereon for selectively rotating workpieces.

In a fifth aspect of the present invention, in addition to the fourth aspect, the workpiece positioning apparatus further includes third and fourth workpiece support arms attached to the main positioner body and extending in directions substantially opposite the first and second workpiece support arms, respectively, each of the third and fourth workpiece support arms also having a workpiece-supporting turntable mounted thereon for selectively rotating workpieces.

In a sixth aspect of the present invention, in addition to the first aspect, the workpiece positioning apparatus may additionally include a base comprising first and second pillar members interconnected by an upper bridge, each of the pillar members having a main rotary turntable mounted thereon, where the main positioner body is rotatably attached to the base at the main rotary turntables, and where these turntables are pivotally movable about a shared exchange axis.

In a seventh aspect of the present invention, a method of operating a workpiece processing machine is provided.

A first step in the method of operating a workpiece processing machine according to the seventh aspect involves installing a first unprocessed workpiece between the first and second support arms on a first side of a workpiece support machine 20 comprising the workpiece support apparatus 30 as described herein.

A second step in the method of operating a workpiece processing machine according to the seventh aspect involves rotating the workpiece support apparatus 180 degrees about an exchange axis X to place the first unprocessed workpiece on a second side of the workpiece support machine 20.

A third step in the method of operating a workpiece processing machine according to the seventh aspect involves performing processing operations on the first unprocessed workpiece and selectively rotating the workpiece between the processing operations, thereby transforming the first unprocessed workpiece into a processed workpiece, while installing a second unprocessed workpiece between the third and fourth support arms on the first side of the workpiece support machine 20.

A fourth step in the method of operating a workpiece processing machine according to the seventh aspect involves rotating the workpiece support apparatus 180 degrees about the exchange axis to move the processed workpiece to the first side of the workpiece support machine.

A fifth step in the method of operating a workpiece processing machine according to the seventh aspect involves removing the processed workpiece from the workpiece support apparatus.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures and methodology needed for illustrating selected embodiments of the present invention are described herein. Other conventional structures, and those of ancillary and auxiliary components of the system, will be known and understood by those skilled in the art.

Figure 1:
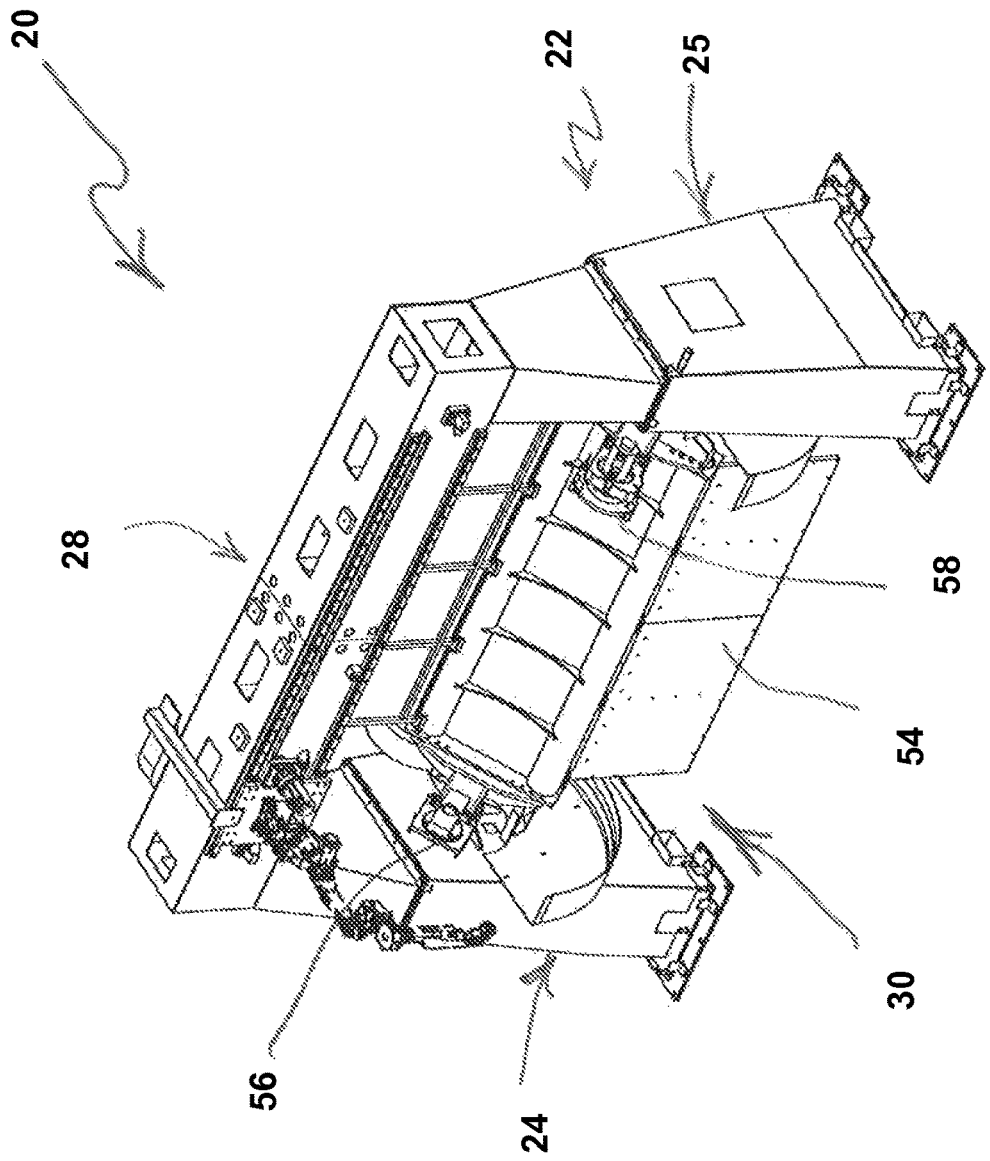
FIG. 1 is a perspective view of a workpiece positioning apparatus according to an illustrative embodiment of the present invention, with the apparatus installed on an optional main base.
Figure 2:
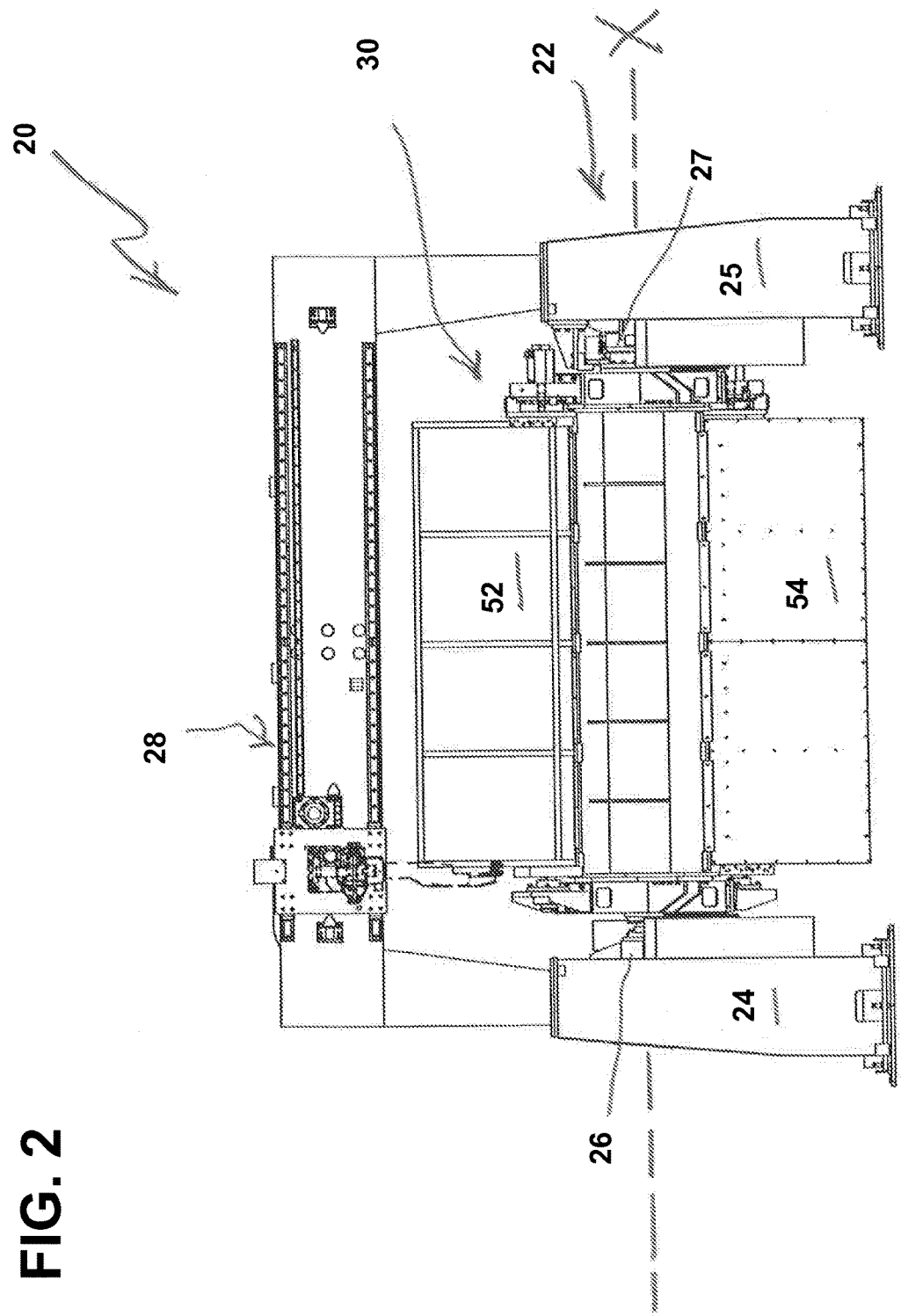
FIG. 2 is a front plan view of the positioning apparatus and base assembly of FIG. 1.

Referring now to FIGS. 1-4 of the drawings, an industrial workpiece positioning machine is shown generally at 20, and includes a main frame 22 and a workpiece positioning apparatus 30 pivotally attached to the main frame, as will be further described herein. The main frame 22 includes a pair of spaced apart pillar members 24, 25, each respectively having a main rotary turntable 26, 27 mounted thereon. The pillar members 24, 25 are interconnected by an upper bridge 28. The workpiece positioning apparatus 30 is rotatably attached to the base 20 at the main rotary turntables 26, 27, and these turntables are pivotally movable about a shared exchange axis X (FIG. 2).

The workpiece positioning apparatus 30 is pivotally movable on the main frame 22, by operation of the main rotary turntables 26, 27 between a first orientation shown in FIG. 1, and a second orientation which is rotated 180 degrees relative to the first orientation. The workpiece positioning apparatus looks substantially the same in the second orientation as it does in the first orientation, because both sides thereof are substantially symmetrical to one another.

Figure 3:
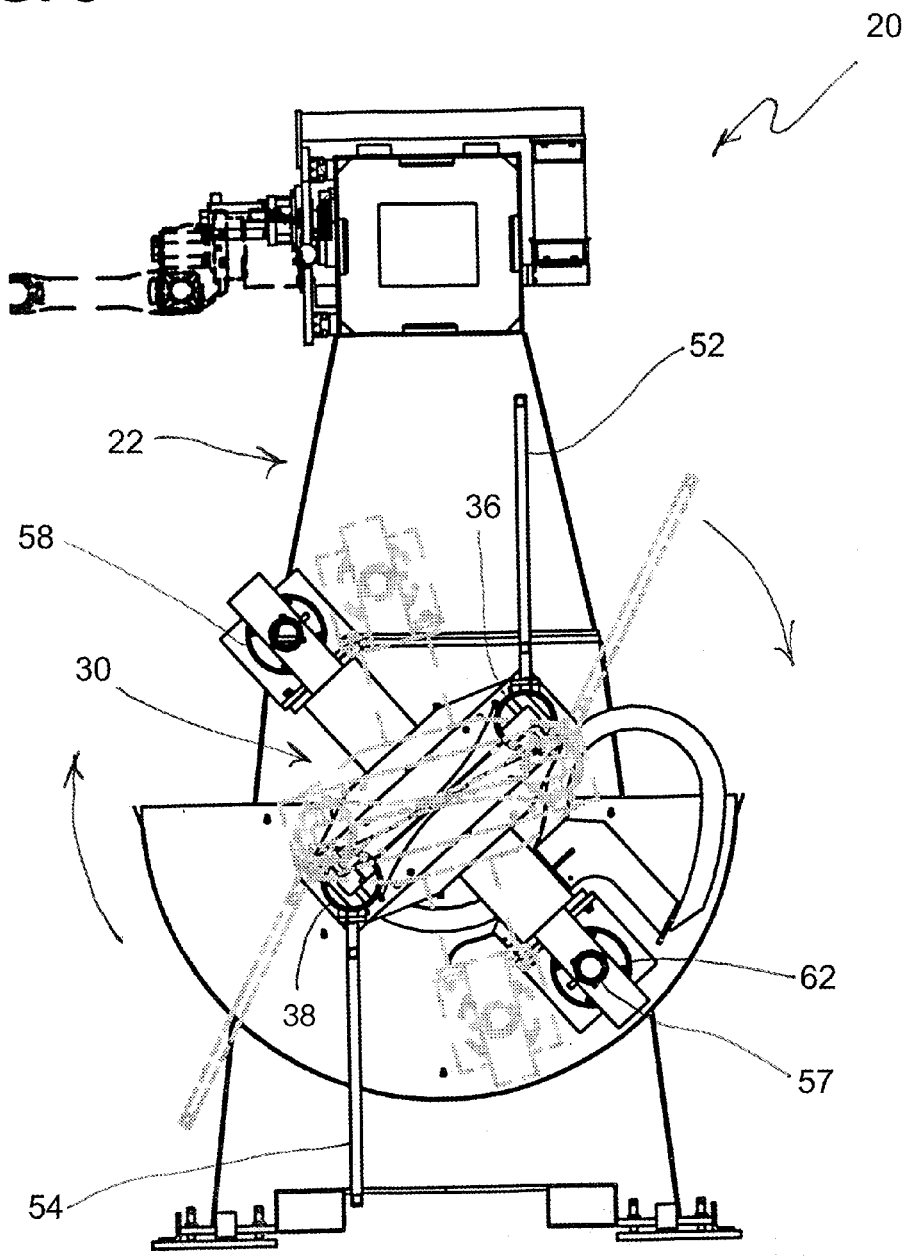
FIG. 3 is a side plan view of the positioning apparatus and part of base assembly of FIG. 1, showing an adjusted orientation of the workpiece positioning apparatus in phantom, as it is rotated about a central exchange axis.

A limited amount of rotary movement of the workpiece positioning apparatus 30 is shown by the phantom outline in FIG. 3, which is included in the drawing for illustrative purposes, and which is displaced only a few degrees of rotation from the solid outline showing the first orientation.

The workpiece positioning apparatus 30 according to the present invention includes a main positioner body 32, which is illustrated separately from the main frame 22 and other parts of the machine 20 in FIGS. 4-7. The main positioner body 32 may be formed of steel, a steel alloy, or another strong metal.

Referring now to FIGS. 4-7, it will be seen that the main positioner body 32 includes first and second spaced-apart end plate members 34, as well as a pair of tubular structural members 36, 38 extending between and interconnecting the end plate members. The tubular structural members 36, 38 are hollow to minimize weight, and may have a round cross-sectional shape as shown, or alternatively, may have another cross-sectional shape such as square, oval, rectangular, triangular, or other desired shape.

The main positioner body 32 also includes a number of substantially co-planar panel sections 40 disposed between and interconnecting the tubular structural members 36, 38, as shown. The panel sections 40 may all have the same width, or may have widths which are different from one another, as desired for a particular application. The panel sections may be welded to the tubular structural members 36, 38.

Figure 8:
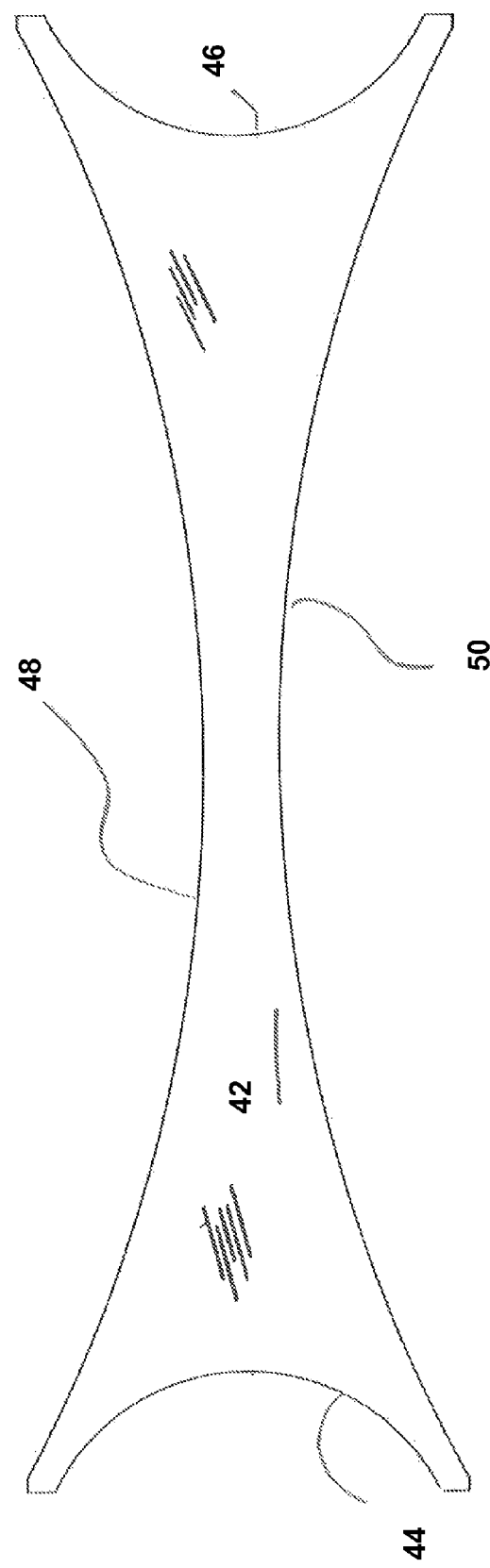
FIG. 8 is a side plan view of a rib member which is a component part of the main positioner body.

The main positioner body 32 further includes a number of identical spaced-apart reinforcing ribs 42 interspersed between the panel sections 40, each of the reinforcing ribs also extending between and interconnecting the two tubular structural members 36, 38. A single isolated reinforcing rib 42 is shown in FIG. 8 for purposes of illustration. Each of the reinforcing ribs 42 has two opposite end faces 44, 46, each of which is configured to receptively engage one of the tubular structural members. Each of the reinforcing ribs 42 also has two opposite side edges 48, 50, and each of these side edges is formed with an arcuate outline shape.

Referring again to FIGS. 2 and 3, it will be seen that optionally, the workpiece positioning apparatus 30 may further include a first shield member 52 operatively attached to the first tubular structural member 36 and extending away from the main positioner body 32 in a first direction. Additionally, the workpiece positioning apparatus 30 may further include a second shield member 54 attached to the second tubular structural member 38 and extending away from the main positioner body 32 in a second direction substantially parallel to the first direction. Where used, the first and second shield members 52, 54 are operatively attached to the main positioner body 32 for concurrent movement therewith.

In the first orientation of the workpiece positioning apparatus 30, as shown in solid lines in FIG. 3, the main positioner body is oriented with the panel sections 40 oriented at a 45 degree angle relative to a vertical plane passing through the exchange axis X, the first shield member 52 is extending upwardly away from the first tubular structural member 36, and the second shield member 54 is extending downwardly away from the second tubular structural member 38.

Figure 4:
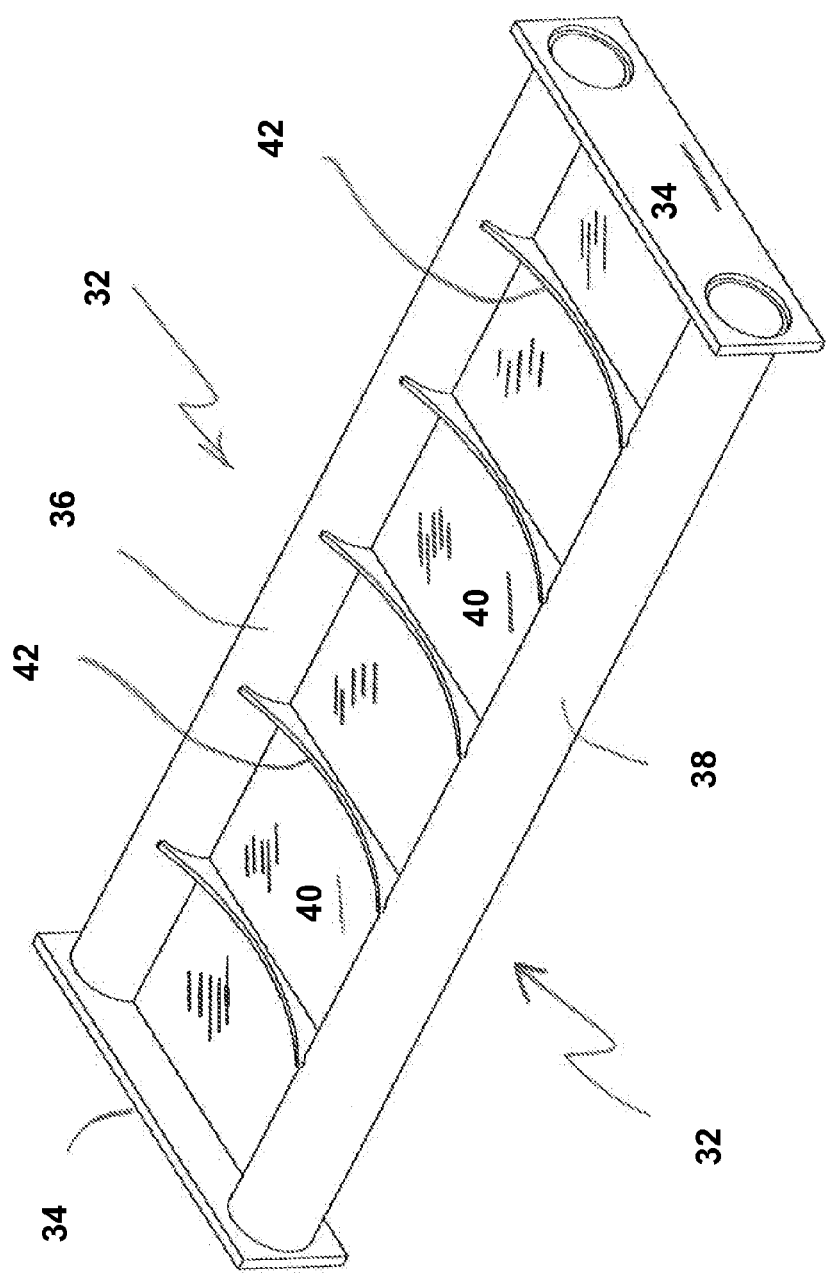
FIG. 4 is a perspective view of a main positioner body which is a central component of the positioning apparatus hereof.
Figure 5:
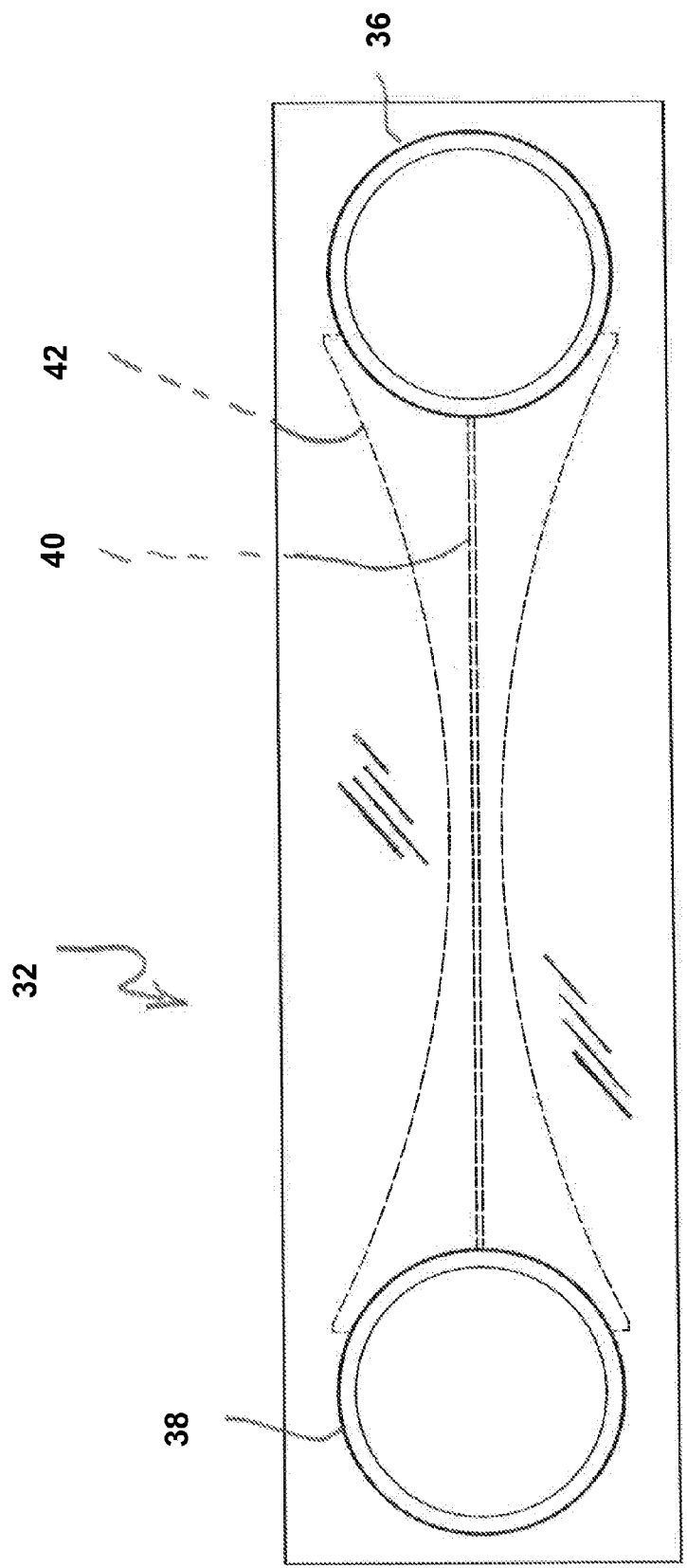
FIG. 5 is a side plan view of the main positioner body.
Figure 6:
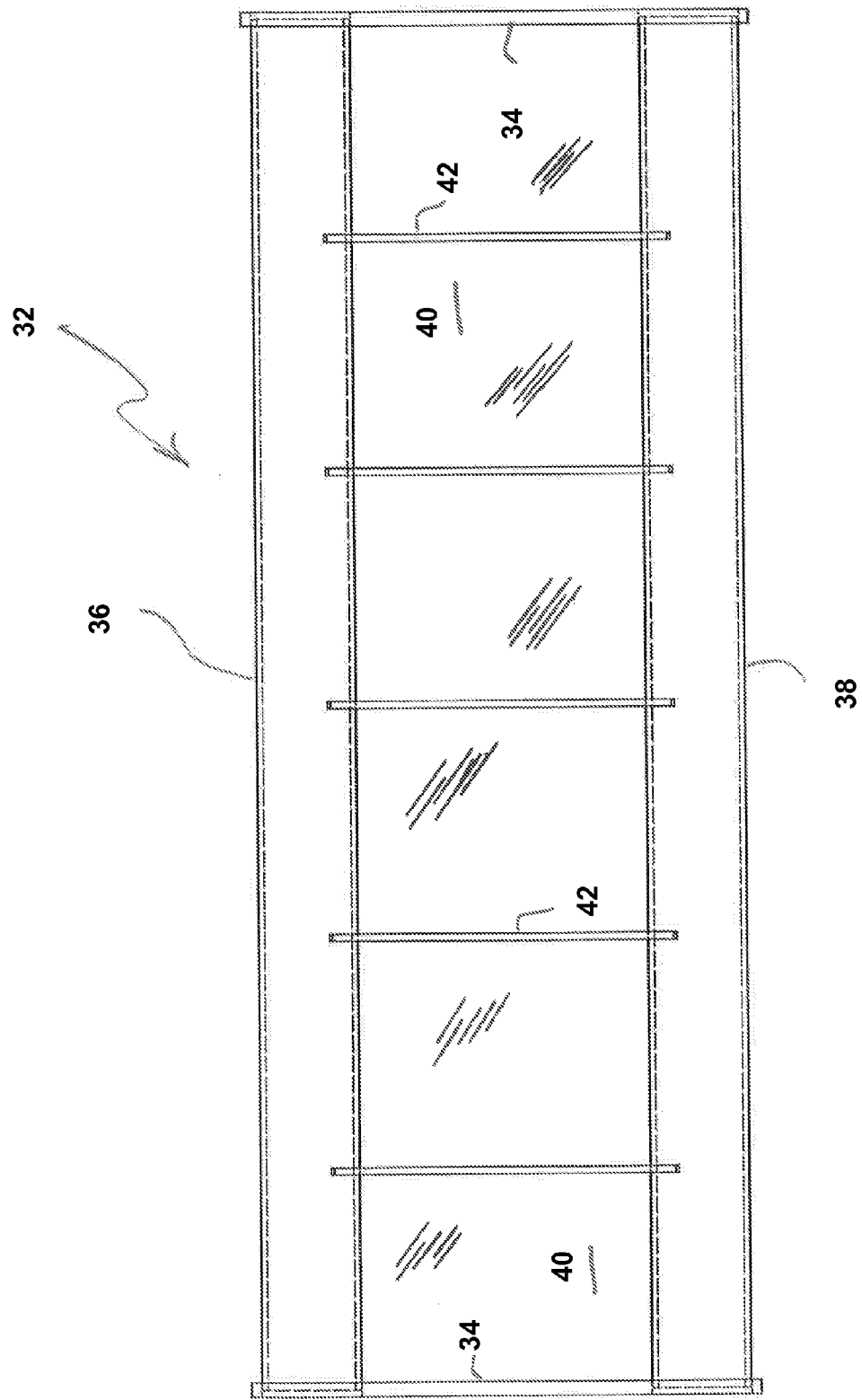
FIG. 6 is a top plan view of the main positioner body.
Figure 7:
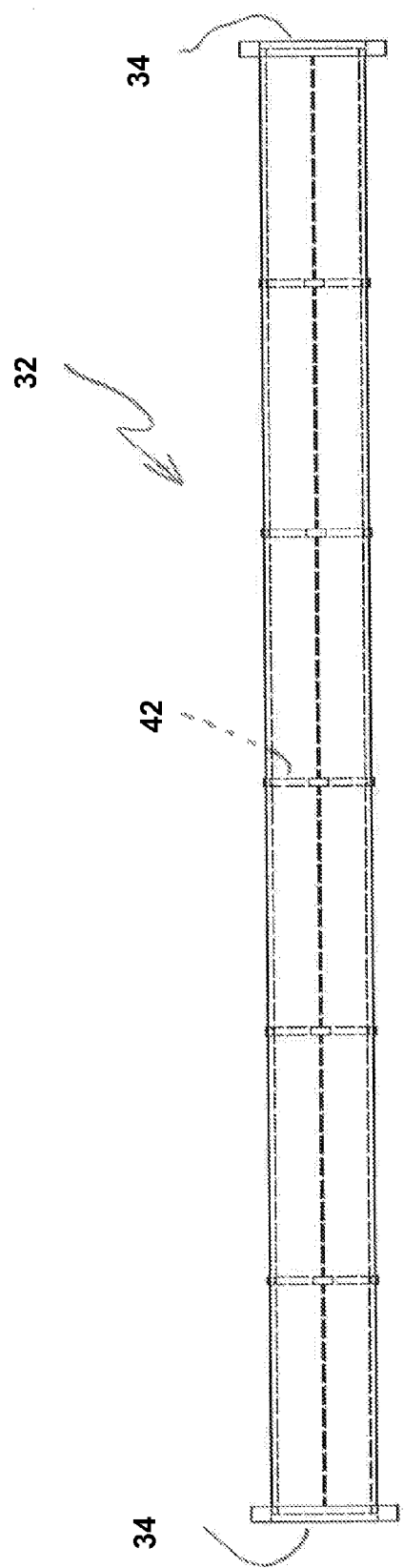
FIG. 7 is a front plan view of the main positioner body.

In the depicted embodiment of the workpiece positioning apparatus 30, as seen in FIGS. 4 and 6, the reinforcing ribs 42 of the main positioner body are oriented parallel to one another and also to the end plate members 34.

The depicted embodiment of the workpiece positioning apparatus 30 further includes first and second workpiece support arms 56, 58 (FIG. 1) operatively attached to the main positioner body 32 for concurrent movement therewith, each of the workpiece support arms having a workpiece-supporting turntable 57 mounted thereon for selectively rotating workpieces during industrial processing, to enable robots (not shown and not considered to be part of the present invention) to perform operations, such as for example, welding or laser cutting, on different areas of the workpieces as needed.

The depicted embodiment of the workpiece positioning apparatus 30 further includes third and fourth workpiece support arms 60, 62 operatively attached to the main positioner body 32 and extending in directions substantially opposite the first and second workpiece support arms 56, 58, respectively. Each of the third and fourth workpiece support arms 56, 58 also has a workpiece-supporting turntable 57 mounted thereon for selectively rotating workpieces.

Figure 9:
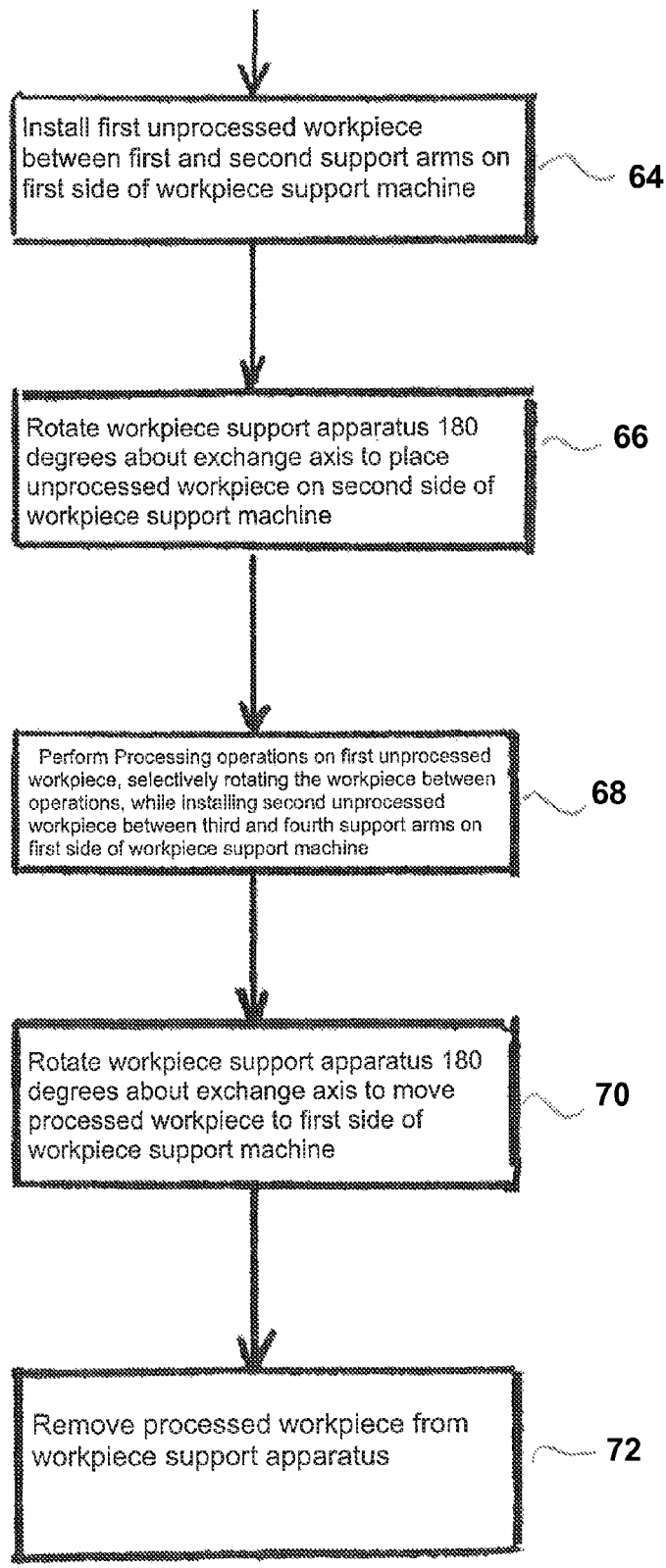
FIG. 9 is a simplified schematic diagram showing steps in a method according to the present invention.

When the workpiece positioning machine is operating using a method according to the present invention, one or more unprocessed workpieces (not shown) are mounted between the workpiece-supporting turntables 57 of the first and second workpiece support arms 56, 58 on a first side of the workpiece support machine 20. This step is shown at 64 in the diagram of FIG. 9.

The workpiece support apparatus is then rotated 180 degrees about the exchange axis X to place the unprocessed workpiece on a second side of the workpiece support machine 20. This step is shown at 66 in the diagram of FIG. 9.

A robot will then perform operations on the workpiece, with the workpiece being selectively and successively rotated to predetermined positions. During such rotary adjustment, the workpiece support apparatus will not interfere with movement of the workpiece, because the arcuate shape of the side edges 48, 50 of the reinforcing ribs allows the workpiece to pass by the ribs unobstructed. While the robot is performing its operations as described above, one or more additional unprocessed workpieces will be mounted between the workpiece-supporting turntables 57 of the third and fourth workpiece support arms 60, 62 on the first side of the workpiece support machine 20. This step is shown at 68 in the diagram of FIG. 9.

After robotic operations have been completed on the first workpiece situated on the second side of the workpiece support machine 20, that workpiece then becomes a processed workpiece, the robot moves out of the way, and the workpiece support apparatus 32 is then once again rotated 180 degrees about the exchange axis X to return the workpiece to the first side of the workpiece support machine 20. This step is shown at 70 in the diagram of FIG. 9.

After such second rotation of the workpiece processing apparatus, the processed workpiece is then removed from the workpiece support apparatus. This step is shown at 72 in the diagram of FIG. 9.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

Having, thus, described the invention, what is claimed is:

1. A workpiece positioning apparatus comprising:
a main positioner body comprising:
a first end plate member and a second end plate member spaced apart from the first end plate member, each of the end plate members operatively attached to a respective main rotary turntable;
first and second tubular structural members extending between and interconnecting the first and second end plate members;
a plurality of panel sections disposed between the first and second end plate members, the panel sections extending between and interconnecting the tubular structural members; and
a plurality of spaced-apart reinforcing ribs extending between and interconnecting the first and second tubular structural members, wherein each of the reinforcing ribs has two opposite side edges each formed with an arcuate outline shape, and wherein each of the reinforcing ribs is disposed between two adjacent panel sections;
wherein the workpiece positioning apparatus further comprises:
a first shield member operatively attached to the first tubular structural member and extending away from the main positioner body in a first direction, and a second shield member attached to the second tubular structural member and extending away from the main positioner body in a second direction substantially parallel to the first direction, the first and second shield members attached to the main positioner body for concurrent movement therewith, wherein the workpiece positioning apparatus further comprises first and second workpiece support arms attached to the main positioner body for concurrent movement therewith, each of the workpiece support arms having a workpiece-supporting turntable mounted thereon for selectively rotating workpieces.

2. The workpiece positioning apparatus of claim 1, wherein the reinforcing ribs of the main positioner body are oriented parallel to one another and also to the end plate members.

3. A workpiece positioning apparatus comprising:
a main positioner body comprising:
a first end plate member and a second end plate member spaced apart from the first end plate member, each of the end plate members operatively attached to a respective main rotary turntable;
first and second tubular structural members extending between and interconnecting the first and second end plate members;
a plurality of panel sections disposed between the first and second end plate members, the panel sections extending between and interconnecting the tubular structural members; and
a plurality of spaced-apart reinforcing ribs extending between and interconnecting the first and second tubular structural members, wherein each of the reinforcing ribs has two opposite side edges each formed with an arcuate outline shape, and wherein each of the reinforcing ribs is disposed between two adjacent panel sections;
wherein the workpiece positioning apparatus further comprises:
first and second workpiece support arms attached to the main positioner body for concurrent movement therewith, each of the workpiece support arms having a workpiece-supporting turntable mounted thereon for selectively rotating workpieces, wherein the workpiece positioning apparatus further comprises third and fourth workpiece support arms attached to the main positioner body and extending in directions substantially opposite the first and second workpiece support arms, respectively, each of the workpiece support arms having a workpiece-supporting turntable mounted thereon for selectively rotating workpieces.

4. The workpiece positioning apparatus of claim 3, further comprising a first shield member operatively attached to the first tubular structural member and extending away from the main positioner body in a first direction, and a second shield member attached to the second tubular structural member and extending away from the main positioner body in a second direction substantially parallel to the first direction, the first and second shield members attached to the main positioner body for concurrent movement therewith.

5. The workpiece positioning apparatus of claim 3, wherein the reinforcing ribs of the main positioner body are oriented parallel to one another and also to the end plate members.

6. A workpiece positioning apparatus for use with at least one robot, said workpiece positioning apparatus comprising:
- a base comprising first and second pillar members interconnected by an upper bridge, each of the pillar members having a main rotary turntable mounted thereon and being pivotally movable about a shared exchange axis;
- a workpiece positioner attached to the base at the main rotary turntables, the workpiece positioner comprising a main positioner body pivotally mounted between the first and second rotary turntables and comprising:
- a first end plate member and a second end plate member spaced apart from the first end plate member, each of the end plate members operatively attached to one of the main rotary turntables;
- first and second tubular structural members extending between and interconnecting the first and second end plate members;
- a plurality of panel sections disposed between the first and second end plate members, the panel sections extending between and interconnecting the tubular structural members; and
- a plurality of spaced-apart reinforcing ribs extending between and interconnecting the first and second tubular structural members, wherein each of the reinforcing ribs has two opposite side edges each formed with an arcuate outline shape;
- wherein each of the reinforcing ribs is disposed between two adjacent ones of the panel sections.

7. The workpiece positioning apparatus of claim 6, further comprising a first shield member operatively attached to the first tubular structural member and extending away from the main positioner body in a first direction, and a second shield member attached to the second tubular structural member and extending away from the main positioner body in a second direction substantially parallel to and substantially opposite to the first direction, the first and second shield members attached to the main positioner body for concurrent movement therewith.

8. The workpiece positioning apparatus of claim 7, wherein the reinforcing ribs of the main positioner body are oriented parallel to one another and also to the end plate members.

9. The workpiece positioning apparatus of claim 6, wherein the reinforcing ribs of the main positioner body are oriented parallel to one another and also to the end plate members.

10. The workpiece positioning apparatus of claim 9, wherein the workpiece positioner further comprises first and second workpiece support arms attached to the main positioner body for concurrent movement therewith, each of the workpiece support arms having a workpiece-supporting turntable mounted thereon for selectively rotating workpieces.

11. The workpiece positioning apparatus of claim 10, wherein the workpiece positioner further comprises third and fourth workpiece support arms attached to the main positioner body and extending in directions substantially opposite the first and second workpiece support arms, respectively, each of the workpiece support arms having a workpiece-supporting turntable mounted thereon for selectively rotating workpieces.

12. The workpiece positioning apparatus of claim 6, wherein the workpiece positioner further comprises first and second workpiece support arms attached to the main positioner body for concurrent movement therewith, each of the workpiece support arms having a secondary turntable mounted thereon for selectively rotating workpieces.

13. The workpiece positioning apparatus of claim 12, wherein the workpiece positioner further comprises third and fourth workpiece support arms attached to the main positioner body and extending in directions substantially opposite the first and second workpiece support arms, respectively, each of the workpiece support arms having a workpiece-supporting turntable mounted thereon for selectively rotating workpieces.

* * * * *